United States Patent
Bogdan

[11] Patent Number: 6,137,240
[45] Date of Patent: Oct. 24, 2000

[54] UNIVERSAL BALLAST CONTROL CIRCUIT

[75] Inventor: Alexei Bogdan, Bolton, Canada

[73] Assignee: Lumion Corporation, Scarborough, Canada

[21] Appl. No.: 09/223,971

[22] Filed: Dec. 31, 1998

[51] Int. Cl.$^7$ ........................................... G05F 1/00
[52] U.S. Cl. ................. 315/307; 315/291; 315/247; 315/362; 315/DIG. 4; 315/DIG. 7
[58] Field of Search .................... 315/307, 308, 315/209 R, 244, 224, 247, 291, 360, 362, DIG. 4, DIG. 5, DIG. 7

[56] References Cited

U.S. PATENT DOCUMENTS

| | | | |
|---|---|---|---|
| 4,277,728 | 7/1981 | Stevens | 315/307 |
| 4,506,195 | 3/1985 | Elms | 315/205 |
| 4,584,488 | 4/1986 | Towers et al. | 307/106 |
| 4,672,300 | 6/1987 | Harper | 323/222 |
| 4,952,849 | 8/1990 | Fellows et al. | 315/307 |
| 5,039,921 | 8/1991 | Kakitani | 315/307 |
| 5,043,635 | 8/1991 | Talbott et al. | 315/291 |
| 5,426,350 | 6/1995 | Lai | 315/244 |
| 5,515,261 | 5/1996 | Bogdan | 363/89 |
| 5,565,123 | 10/1996 | Wolff | 219/501 |
| 5,569,984 | 10/1996 | Holtslag | 315/307 |
| 5,583,402 | 12/1996 | Moisin et al. | 315/308 |
| 5,825,223 | 10/1998 | Mader | 327/170 |
| 5,872,429 | 2/1999 | Xia et al. | 315/194 |

Primary Examiner—Haissa Philogene
Attorney, Agent, or Firm—Bereskin & Parr

[57] ABSTRACT

A universal ballast control circuit allows a universal ballast to accommodate a gas discharge lamp within a relatively wide wattage range using a low-speed microcontroller. The control circuit drives the ballast to start, run and dim a particular lamp type by providing a control voltage signal to a conventional inverter MOSFET driver to effect dynamic and selective changes in the duty cycle and the frequency of the inverter signal. In one aspect of the invention, the control circuit comprises a generator for generating a periodic analog voltage signal, a source for producing a DC voltage signal, a controller which includes a low-speed microcontroller for varying the frequency of the periodic analog voltage signal and the magnitude of the DC voltage signal, and a comparator for comparing the periodic analog voltage signal and the DC voltage signal to produce a control voltage signal. In another aspect of the invention, the control circuit comprises a generator for generating a periodic analog voltage signal, a controller for controlling the shape of the periodic analog voltage signal, and a comparator for comparing waveforms of the periodic analog voltage signal with the waveforms of two DC threshold voltages to generate a control signal. The present invention allows for the control circuit to be powered by a power supply signal either derived from an inverter half-bridge MOSFET driver, extracted from a boost inductor of the boost converter or generated by an appropriately configured dedicated miniature switch mode power supply. Finally, control circuit can be utilized to drive PFC circuity in a feedback configuration to regulate the level of boost converter output voltage signal.

23 Claims, 11 Drawing Sheets

UNIVERSAL BALLAST CONTROL CIRCUIT

FIELD OF THE INVENTION

The present invention relates generally to lighting ballasts and in particular to a universal ballast control circuit for controlling the operation of a wide range of gas discharge lamp types.

BACKGROUND OF THE INVENTION

Significant improvements in programmable microcontrollers over the past five years as well as the existence of dimming systems which use complex algorithms have caused most major electronic ballast companies to develop microcontroller driven electronic ballasts. These electronic ballasts typically use microcontrollers to adjust the characteristics of the inverter voltage signal to accommodate a wide variety of lamps and/or to provide dimming functionality. Specifically, by changing the frequency or duty cycle of the inverter voltage signal, these electronic ballasts are able to start, run and dim a wide variety of gas discharge lamps.

Some electronic ballasts such as the one disclosed by U.S. Pat. No. 5,039,921 to Kakitani uses a central processing unit (CPU) to control the frequency of the inverter voltage signal to change lamp voltage. The Kakitani patent describes a ballast which can be adapted to light and drive various types of gas discharge lamps according to each lamp's individual rating. The control circuit employs the CPU to detect the rating of the discharge lamp based on the lamp's starting voltage and to retrieve stored lamp loading data from memory relating to the type of discharge lamp detected. The oscillating frequency of the inverter circuit voltage signal is then adjusted so that the ballast produces a power voltage signal suited to the particular discharge lamp.

Other electronic ballasts such as the one disclosed by U.S. Pat. No. 5,569,984 to Holtstag use a microprocessor to control the switching frequency and the pulse width of the inverter voltage signal provided to a particular lamp to avoid strong acoustic resonances or arc instabilities. The microprocessor evaluates deviation of electrical lamp parameters to detect arc instabilities and adjusts the frequency and pulse width in response. Accordingly, the ballast can operate HID lamps of different types, wattages and manufacturers over a broad frequency range despite the occurrence of acoustic resonance/arc instabilities among these lamps.

In order to achieve acceptable levels of accuracy in running and dimming a wide variety of gas-discharge lamps, it is necessary to be able to produce a wide variety of inverter voltage signals which requires a high resolution of control signals. Low-speed microcontrollers cannot provide the necessary degree of control to run a lamp within a ballast having conventional inverter signal frequencies. In order to achieve the desired operation of a typical ballast, expensive high-speed microcontrollers must be used which severely limits mass production and consumption of microcontroller-based electronic ballasts due to the cost of such high-speed microcontrollers.

Further, since microcontrollers provide discreet output, when digital output levels are provided to a lamp, sudden incremental changes in the lumen output are produced. These discrete "steps" in light intensity are visible to users and are unacceptable in commercial and residential environments. Even when the microcontroller is programmed to dim a lamp in relatively small increments, dimming a lamp using a digital signal still results in visible steps.

Finally, in order to provide sufficient power supply to the microcontroller, either a drop-down resistor or a dedicated off-line power supply circuitry is used. The problem with using a simple voltage-drop resistor is that the heat and high frequency noise which are generated are very difficult to suppress. On the other hand, a separate off-line power supply adds substantial expense to the product.

Thus, there is a need for a universal lighting ballast control circuit which can produce a wide range of different control signals to start, run and dim a wide variety of gas-discharge lamp types using an inexpensive low-speed microcontroller, which can modulate illumination levels on a continuously variable basis and which provides power to the microcontroller without conventionally known power supply problems and associated expense.

BRIEF SUMMARY OF THE INVENTION

It is therefore an object of the present invention in one aspect to provide a universal ballast control circuit for use with a power circuit coupled to an AC source for outputting a high frequency AC signal and a coupling circuit coupled to the power circuit for applying the AC signal to any one of a plurality of gas discharge lamp types, said control circuit comprising:

(a) a generator for generating a periodic analog voltage signal having a first waveform;

(b) a source for generating a first DC voltage signal having a second waveform;

(c) a controller for controlling the frequency of the periodic analog voltage signal; and (d) a processor for processing said first DC voltage signal and said periodic analog voltage signal to generate a control voltage signal for varying the frequency and duty cycle of the AC signal, the frequency and duty cycle of said control voltage signal being dependent on said first and second waveforms.

In a second aspect, the present invention provides a universal ballast control circuit for use with a power circuit coupled to an AC source for outputting a high frequency AC signal and a coupling circuit coupled to the power circuit for applying the AC signal to any one of a plurality of gas discharge lamp types, said control circuit comprising:

(a) a generator for generating a periodic analog voltage signal having a first waveform;

(b) a controller for controlling the shape of said first waveform; and (c) a comparator for comparing the periodic analog voltage signal with at least one DC voltage and for generating a control voltage signal for varying the duty cycle and frequency of the AC signal.

In a third aspect, the present invention provides a method of powering any one of a plurality of gas discharge lamp types, each lamp type having a predetermined set of lamp characteristics, said method comprising the steps of:

(a) producing a high frequency AC signal;

(b) applying the AC signal to the lamp;

(c) generating a periodic analog voltage signal having a first waveform;

(d) generating a DC voltage signal having a second waveform;

(e) controlling the frequency of the periodic analog voltage signal;

(f) controlling the magnitude of the DC voltage signal;

(g) varying the duty cycle and frequency of the AC signal based on a comparison of the first and second waveforms.

In a fifth aspect, the present invention provides a method of powering any one of a plurality of gas discharge lamp types, each lamp type having a predetermined set of lamp characteristics, said method comprising the steps of:

(a) producing a high frequency AC signal;

(b) applying the AC signal to the lamp;

(c) generating a periodic analog voltage signal having a first waveform;

(d) controlling the shape of the first waveform;

(e) varying the duty cycle and frequency of the AC signal based on a comparison of first waveform and at least one DC threshold voltage.

It also an object of the present invention to provide a method of controlling the output voltage of a boost converter of a gas-discharge lighting ballast, said method comprising the steps of:

(a) applying a DC signal to a power switch to produce a boost converter output voltage;

(b) generating a periodic AC voltage signal;

(c) varying the waveform characteristics of the periodic AC voltage signal to form a modulated periodic AC voltage signal;

(d) comparing the modulated periodic AC voltage signal with the boost converter output voltage; and (e) applying the result to the power switch to change the output voltage of the boost converter.

Further objects and advantages of the invention will appear from the following description, taken together with the accompanying drawings.

DETAILED DESCRIPTION OF PREFERRED EMBODIMENTS

Figure 1:
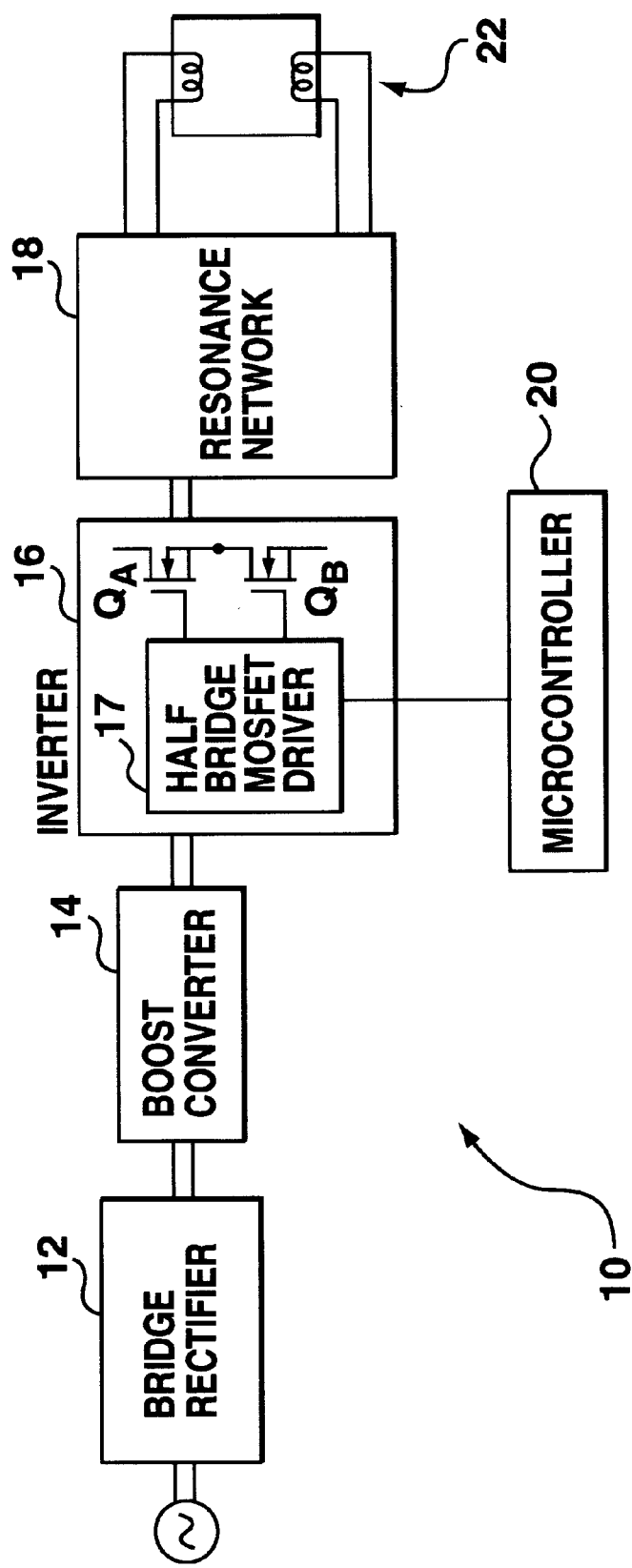
FIG. 1 is a block diagram of a typical prior art microcontroller-based electronic lighting ballast.

Reference is first made to FIG. 1, which shows a prior art microcontroller-based electronic ballast 10. As is conventionally known, ballast 10 includes a bridge rectifier 12, a boost converter 14, an inverter 16, resonance network 18, and a microcontroller 20. Ballast 10 is used to power a lamp 22 as is conventionally known.

Bridge rectifier 12 is coupled to a typical AC power line voltage of 110–120 Volts. A rectifier consisting of diodes provides a full-wave rectified DC voltage of about 160 Volts across its output. Bridge rectifier 12 may also include an EMI filter for insulating the power lines from interference generated by ballast 10.

Boost converter 14 is coupled to the output of bridge rectifier 12 and is used to boost and control the input DC voltage provided by bridge rectifier 12 such that appropriate power is provided to lamp 22. Boost converter 14 provides regulated voltage to inverter 16.

Inverter 16 is a voltage-fed half-bridge DC-AC inverter which is used to convert the input DC voltage received from boost converter 14 into high frequency AC voltage. Half-bridge inverter 16 typically includes a half-bridge MOSFET driver 17 and MOSFET transistors $Q_A$ and $Q_B$ at its output, although many other implementations are possible (i.e. using bipolar transistors). MOSFET driver 17 is typically implemented using an integrated circuit such as IR2104 manufactured by International Rectifier. Transistors $Q_A$ and $Q_B$ produce an inverter voltage signal which is a high frequency generally square wave signal, as is familiar to those skilled in the art. The high frequency signal generated by transistors $Q_A$ and $Q_B$ is applied to resonance network 18.

Resonance network 18 is directly coupled to lamp 22 and is commonly used to avoid the necessity of an output transformer. Resonance network 18 typically includes an LCC network of capacitors and inductors which provides waveshaping and current limiting to produce a substantial sinusoidal lamp current for lamp 22. Ballast designers choose an optimal inverter frequency and optimal values of LCC circuit inductance and capacitance to create proper currents and voltages across the lamp as well as to produce an economical ballast configuration. The LCC network also functions as an igniter to ignite the lamp upon initial application of power to ballast 10.

Microcontroller 20 is used to control the operating frequency or duty cycle of the inverter voltage signal. In order for ballast 10 to properly operate lamp 22, ballast 10 must be able to produce certain voltage and current characteristics which are suited to a lamp's particular characteristics. When lamp 22 has been struck and is in full operation, its running voltage must be within its manufacturer's specified range. Typically, ballast 10 would be designed to provide a voltage between 35 and 130 volts (rms) for running operation of lamp 22. Particular voltages must be provided across the filaments of lamp 22 during the course of lamp operation. Further, the current flowing through lamp 22 must also be such that lamp 22 can be safely run. Finally, a sufficient striking (or ignition) voltage must be applied to lamp 22, such that the pressurized gas ignites into plasma form and forms a plasma thread. The provision of all of these voltage and current characteristics is accomplished by controlling the operation of half-bridge MOSFET driver 17 which in turn drives transistors $Q_{f1}$ and $Q_{f2}$ of inverter 16. By controlling the duration and frequency that transistors $Q_{f1}$ and $Q_{f2}$ are conductive, microcontroller 20 can ensure that ballast 110 provides the proper striking, running and dimming of lamp 22.

However, in order for ballast 10 to provide the above discussed circuit conditions, microcontroller 20 must operate at a high-speed to produce a sufficient number of control levels. If microcontroller operates at too low a speed, then ballast 10 will not be able to accurately provide the various current and voltage characteristics which are necessary for proper running and dimming of lamp 22.

As an illustration, consider a typical low-speed 8-pin microcontroller such as the PIC12C508 from Microchip Technology. If this microcontroller 20 is configured to directly drive the output half-bridge inverter 16 of ballast 10, it will result in inaccurate operation of ballast 10. The nominal frequency of the PIC12C508 microcontroller 20 is 4 MHz, a typical value for this slower class of microcontrollers.

Since an instruction can only be acted on by microcontroller 20 once every four timing cycles, the command cycle time $T_C$ for this device would be:

$$T_C = 4\left(\frac{1}{F}\right) = 4\left(\frac{1}{4\times 10^6}\right) = 1 \ \mu sec$$

Accordingly, every 1 μsec a digital voltage level can be provided to inverter 16 to change the current and voltage characteristics of resonance network 18. Typically, fluorescent electronic ballasts operate in a frequency range between 20 kHz to 60 kHz. For a ballast having an operating frequency of 40 kHz, the duration of the half-cycle pulse $T_{1/2}$ of the inverter voltage is:

$$T_{1/2} = \frac{1}{40\times 10^3} \times \frac{1}{2} = 12.5 \ \mu sec$$

Accordingly, in order to adjust the duty cycle or the frequency of the inverter voltage signal, there are only be 12 steps in which to do so. The overall accuracy of such control circuitry is approximately 8.3%. This accuracy becomes worse when the full range of 50/50 duty cycle oscillation cannot be used. When the duty cycle is 20/80 or even 10/90, the driving accuracy of the control circuitry will only be about 50–80% which is unacceptable for proper operation of ballast 10.

Consequently, it is necessary to use high-speed microcontrollers which run at speeds of between 20 MHz to 40 MHz to properly control the operation of typical ballasts running at frequencies between 20 kHz to 60 kHz. Such microcontrollers are typically priced at between US$5 to US$10 each, which prohibits cost-effective production of ballast 10. Further, when the frequency of the digital output pulses produced by high-speed microcontrollers 20 is changed, sudden incremental changes in the lumen output of lamp 22 result which are visually perceived as light intensity "steps". For example, even when microcontroller 20 is programmed to dim lamp 22 using 128 light intensity steps, the inventor has found that visible steps still occur.

Figure 2:
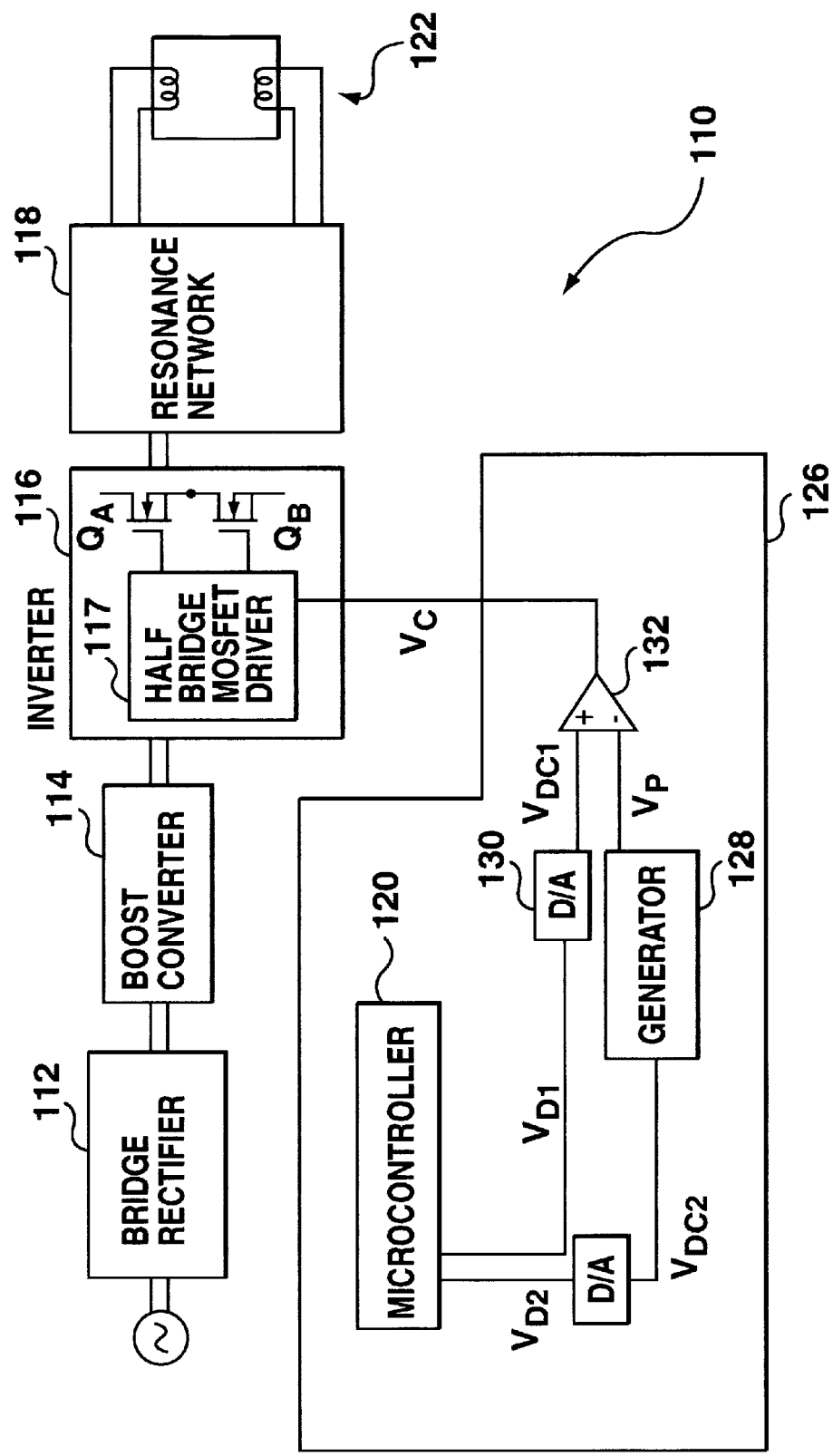
FIG. 2 is a block diagram of the present invention.
Figure 3:
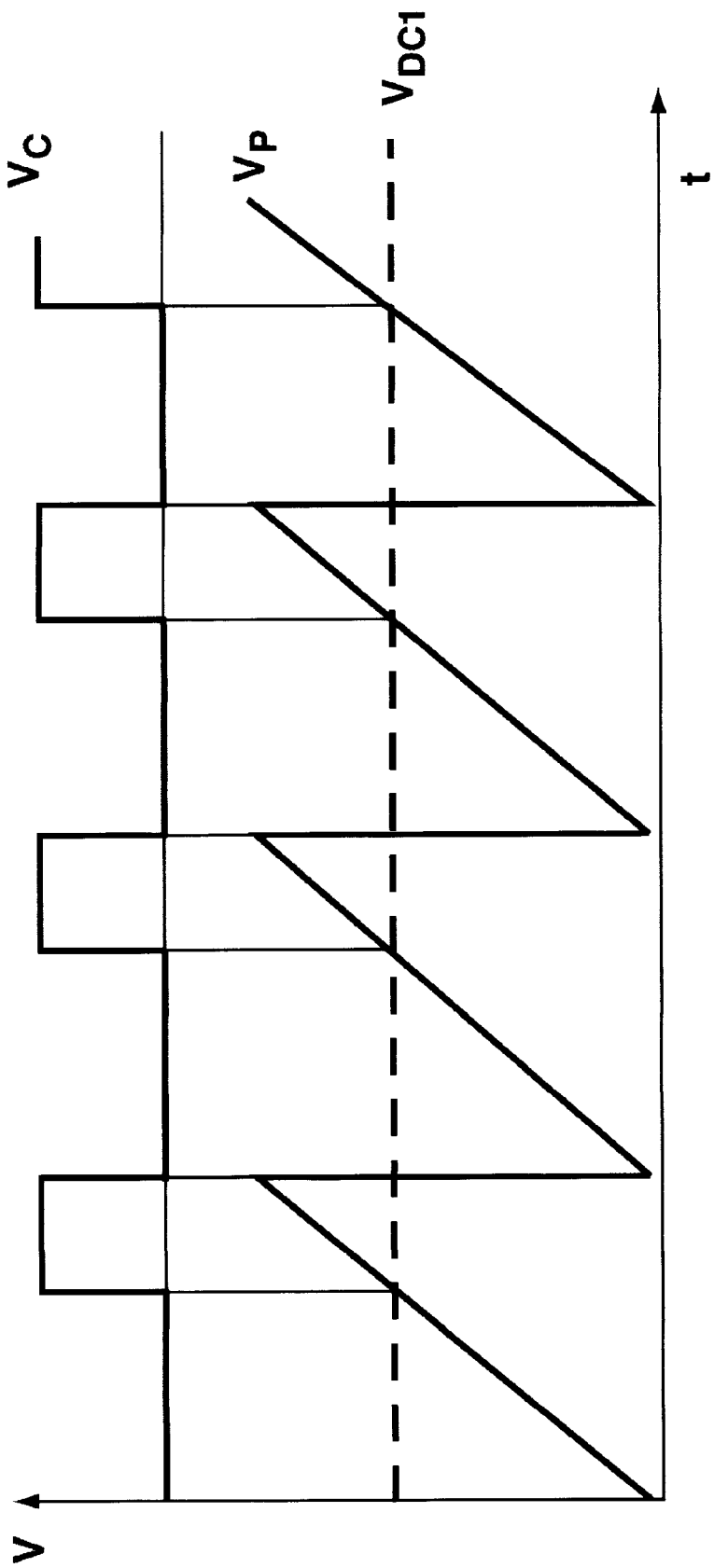
FIG. 3 is a waveform timing diagram showing the control voltage signal $V_C$ which is produced when a DC voltage signal $V_{DC}$ is compared with a periodic voltage signal $V_P$ in the present invention.

Reference is now made to FIGS. 2 and 3, which show an improved microcontroller-based programmable ballast 110 which includes a control circuit 126, according to a preferred embodiment of the invention. Control circuit 126 is designed to utilize a relatively inexpensive microcontroller 120 to control the inverter voltage signal to start, run and dim a wide range of lamp types. Common elements between ballast 110 and the prior art ballast 10 will be denoted by the same numerals with one hundred added thereto.

Accordingly, ballast 110 includes a bridge rectifier 112, a boost converter 114, an inverter 116, resonance network 118, a microcontroller 120 as previously discussed. Ballast 110 also comprises control circuit 126 which uses a low-speed microcontroller 120 for proper operation of ballast 110.

Control circuit 126 provides an analog control voltage signal $V_C$ to half-bridge MOSFET driver 117 which in turn drives MOSFET transistors $Q_A$ and $Q_B$. Control circuit 126 comprises microcontroller 120, periodic signal generator 128, a digital-to-analog (D/A) converter 130 and a comparator 132.

Microcontroller 120 of the present invention can be a conventional low-cost microprocessor such as PIC12C508 from Microchip Technology. Microcontroller 120 generates digital voltage signals $V_{D1}$ and $V_{D2}$ which are input into control circuit 126.

Periodic voltage signal generator 128 receives digital voltage signal $V_{D2}$ from microcontroller 120 and generates a periodic voltage signal $V_P$. While any periodic voltage signal can be used within control circuit 126, the inventor has determined that a sawtooth waveform is preferable as a sawtooth generator can be implemented by a simple and low cost circuit. For example, a conventional timer integrated circuit (e.g. a 555 timer circuit or an IR5155 oscillator circuit) configured with appropriate resistive and capacitor elements attached to various pin inputs and outputs generates a sawtooth waveform, as is conventionally known and as will be discussed.

Figure 4B:
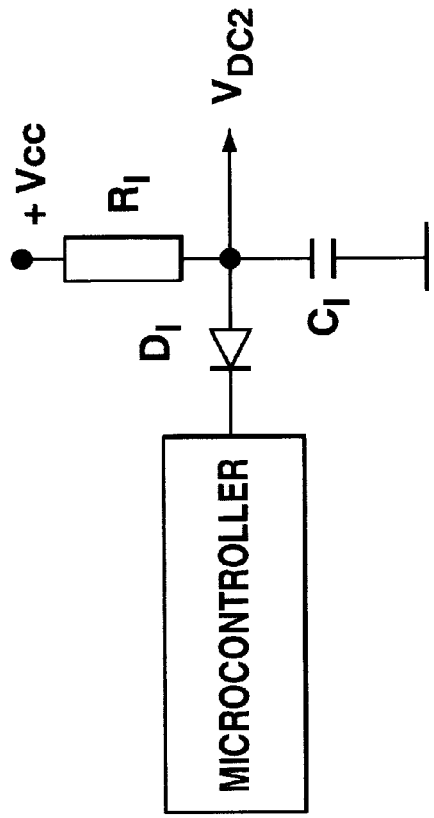
FIG. 4B is another circuit implementation of the digital-to-analog converter of the present invention.
Figure 4A:
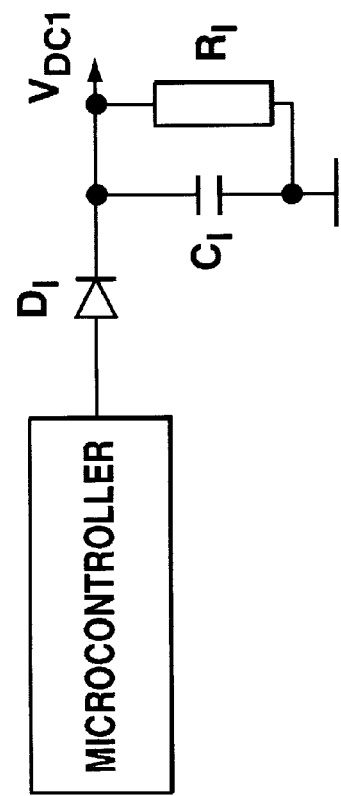
FIG. 4A is a circuit diagram of the digital-to-analog converter of the present invention.

D/A converter 130 converts the digital voltage signal $V_{D1}$ produced by microcontroller 120 into an analog voltage signal $V_{DC1}$. D/A converter 130 is preferably implemented using an integrating capacitor $C_I$, either a series or parallel connected resistor $R_I$ and an appropriately oriented diode $D_I$ as shown in FIGS. 4A and 4B, to form a conventional integrator circuit. It has been determined that it is preferable to use the circuits of FIGS. 4A and 4B instead of conventionally available D/A integrated circuits to ensure that a wide range of analog signals can be produced cost effectively.

Referring back to FIGS. 2 and 3, comparator 132 is a general-purpose comparator integrated circuit such as the LM393 integrated circuit manufactured by Linear Technology. As shown, the DC voltage signal $V_{DC1}$ being output by the D/A converter 130 is provided to the positive input of comparator 132 and the periodic voltage signal $V_P$ is provided to the negative input of comparator 132. Comparator 132 produces a control voltage signal $V_C$ waveform having a duty cycle $DC_C$ and a frequency $f_C$ as shown in FIG. 3.

Control voltage duty cycle $DC_C$ is dependent on the comparative values of the DC voltage signal $V_{DC1}$ and the periodic voltage signal $V_P$. It will be seen from FIG. 3 that when periodic voltage $V_P$ exceeds $V_{DC1}$, control voltage $V_C$ goes high and while periodic voltage $V_P$ is less than DC voltage signal $V_{DC1}$, control voltage $V_C$ goes low. Accordingly, control voltage duty cycle $DC_C$ can be varied by adjusting the value of the DC voltage signal $V_{DC1}$ or by changing the digital voltage signal $V_{D1}$ generated by microcontroller 120.

Further, as can be seen from FIG. 3, the control voltage frequency $f_C$ is equivalent to the frequency of the periodic voltage signal $V_P$. Accordingly, the control voltage frequency $f_C$ can be varied by controlling the frequency of the periodic voltage signal $V_P$. One way of accomplishing this is by using the DC voltage signal $V_{DC2}$ from microcontroller 120 to control the current source of the periodic voltage signal generator 128 as will be discussed below.

Figure 5:
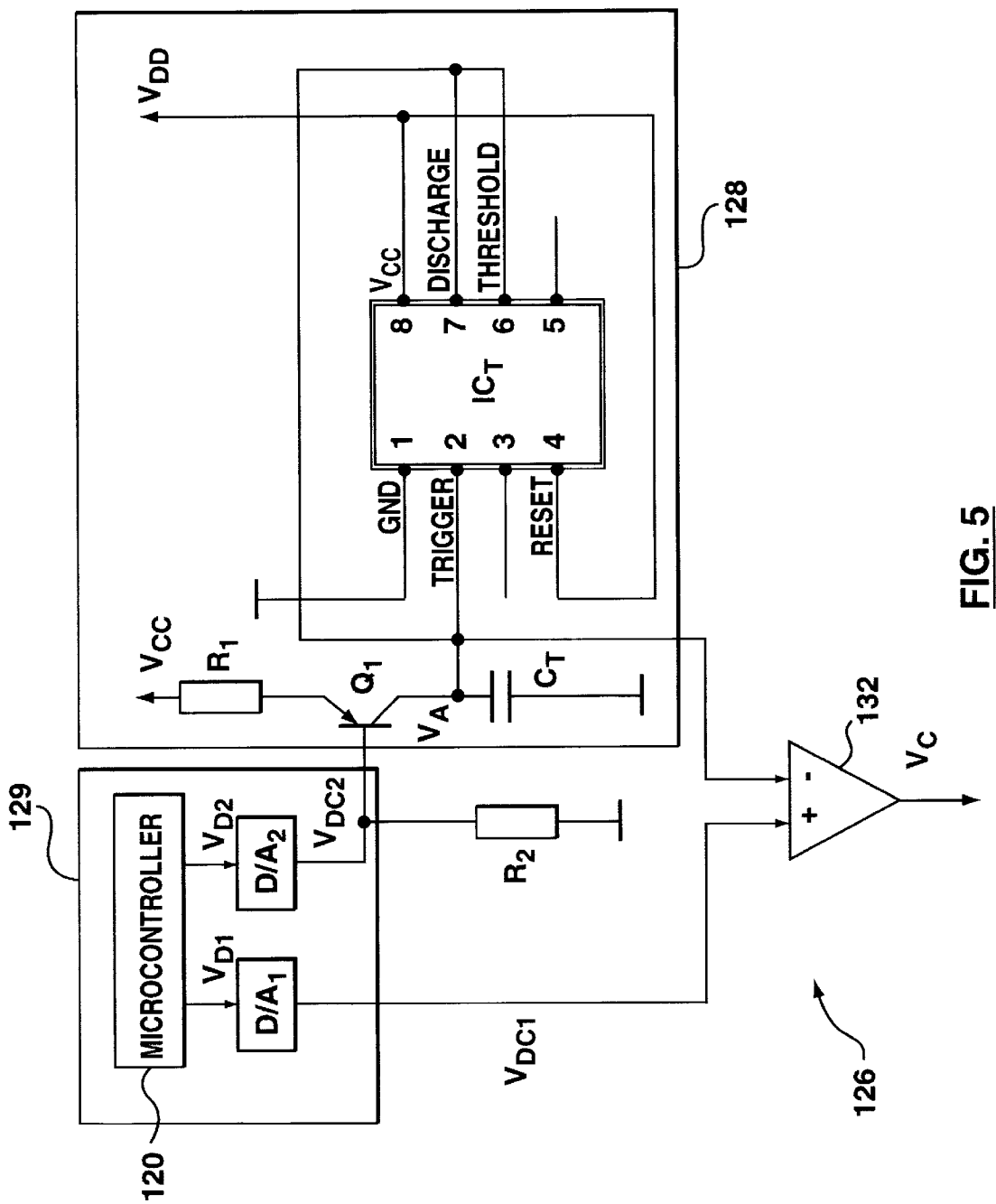
FIG. 5 is a circuit diagram of an implementation of the control circuit of the present invention in which the microcontroller and two digital-to-analog converters provide DC signals $V_{DC1}$ and $V_{DC2}$ which are used to vary the duty cycle and frequency of the control voltage signal $V_C$.

FIG. 5 shows one possible circuit implementation of control circuit 126 in which both the control voltage duty cycle $DC_C$ and the control voltage frequency $f_C$ are varied using a periodic voltage signal generator 128, a controller 129, and a comparator 132.

Controller 129 includes microcontroller 120 and D/A converters $D/A_1$ and $D/A_2$. Microcontroller 120 outputs two separate digital control voltages $V_{D1}$ and $V_{D2}$ into D/A converters $D/A_1$ and $D/A_2$, respectively which in turn convert them into DC voltage signals $V_{DC1}$ and $V_{DC2}$. DC voltage signal $V_{DC1}$ is input into the positive input of comparator 132 and DC voltage signal $V_{DC2}$ is used to control the current source of the periodic voltage signal generator 128. By varying DC voltage signal $V_{DC1}$, it is possible to control the control voltage duty cycle $DC_C$ being output by comparator 132 as previously described. By varying the DC voltage signal $V_{DC2}$, it is possible to control the control voltage frequency $f_C$, as will be discussed.

Periodic voltage signal generator 128 generates a sawtooth waveform using timer $IC_T$, resistors $R_1$ and $R_2$, capacitor $C_T$, and transistor $Q_1$. Timer $IC_T$ is a conventional timer integrated circuit such as a 555 timer circuit or an IR5155 oscillator circuit. RESET (pin 4) and VCC (pin 8) are connected to running voltage $V_{DD}$. TRIGGER (pin 2), THRESHOLD (pin 6) and DISCHARGE (pin 7) of timer $IC_T$ are coupled at node A to a grounded timing capacitor $C_T$. Transistor $Q_1$ has its collector connected to node A and its emitter connected to voltage $V_{cc}$ through resistor $R_1$. Accordingly, periodic voltage signal $V_P$ having a sawtooth waveform is generated at the collector of transistor $Q_1$ as is conventionally known. The current source comprising resistor $R_1$ and transistor $Q_1$ powered by voltage $V_{cc}$ serves to stabilize the charge current on capacitor $C_T$.

When the periodic voltage signal $V_P$ THRESHOLD (pin 6) rises above $\frac{2}{3} V_{DD}$, timer $IC_T$ shorts capacitor $C_T$ to ground at DISCHARGE (pin 7) through its internal discharge transistor. When the periodic voltage signal $V_P$ at THRESHOLD (pin 6) falls below $\frac{1}{3} V_{DD}$, the internal discharge transistor in timer $IC_T$ is disabled and capacitor $C_T$ begins to recharge from $V_{CC}$ through resistor $R_1$ and transistor $Q_1$. In this way, timer $IC_T$ can be configured to operate as an astable multivibrator such that a periodic voltage signal $V_P$ is produced across capacitor $C_T$. Since the current flowing through transistor $Q_1$ is controlled by DC voltage signal $V_{DC2}$, it is possible to control the frequency of the periodic voltage signal $V_P$ by appropriately varying DC signal $V_{DC2}$. Transistor $Q_1$ operates as a linear modulating amplifier since $Q_1$ is always biased in its active region. Accordingly, as DC voltage signal $V_{DC2}$ is increased, the current flowing through transistor $Q_1$ is increased (i.e. impedance of transistor $Q_1$ is decreased) and capacitor $C_T$ Will charge at a faster rate. Thus, the set-point of $\frac{2}{3} V_{DD}$ will be reached more quickly causing the frequency of periodic voltage signal $V_P$ to increase which in turn will increase the control voltage frequency $f_C$. Since the current source comprising resistor $R_1$, transistor $Q_1$ voltage $V_{CC}$ can be considered to operate as a variable impedance having a linear characteristic when $V_{DC2}$ is applied to the base of $Q_1$, the duty cycle of the control voltage signal $V_C$ will not be affected by changes in DC signal $V_{DC2}$.

Further, by changing the value of DC voltage signal $V_{DC1}$, it is possible to change the control voltage duty cycle $DC_C$ in a continuous manner. If the integrator capacitor $C_I$ of D/A converter $D/A_1$ is large, a wide range of DC voltage signals $V_C$, each having a unique DC threshold voltage, can be generated for comparison with periodic voltages $V_P$. As DC voltage signal $V_{DC1}$ is reduced, the duty cycle of control voltage $V_C$ increases and as DC voltage signal $V_{DC1}$ increases, the duty cycle of control voltage $V_C$ decreases. It should be noted that the frequency of control voltage $V_C$ will not change as DC voltage signal $V_{DC1}$ is varied.

Consequently, it is possible for microcontroller 120 and control circuit 126 to generate a wide range of control voltages $V_C$, each with a unique frequency $f_C$ and duty cycle $DC_C$.

Figure 6:
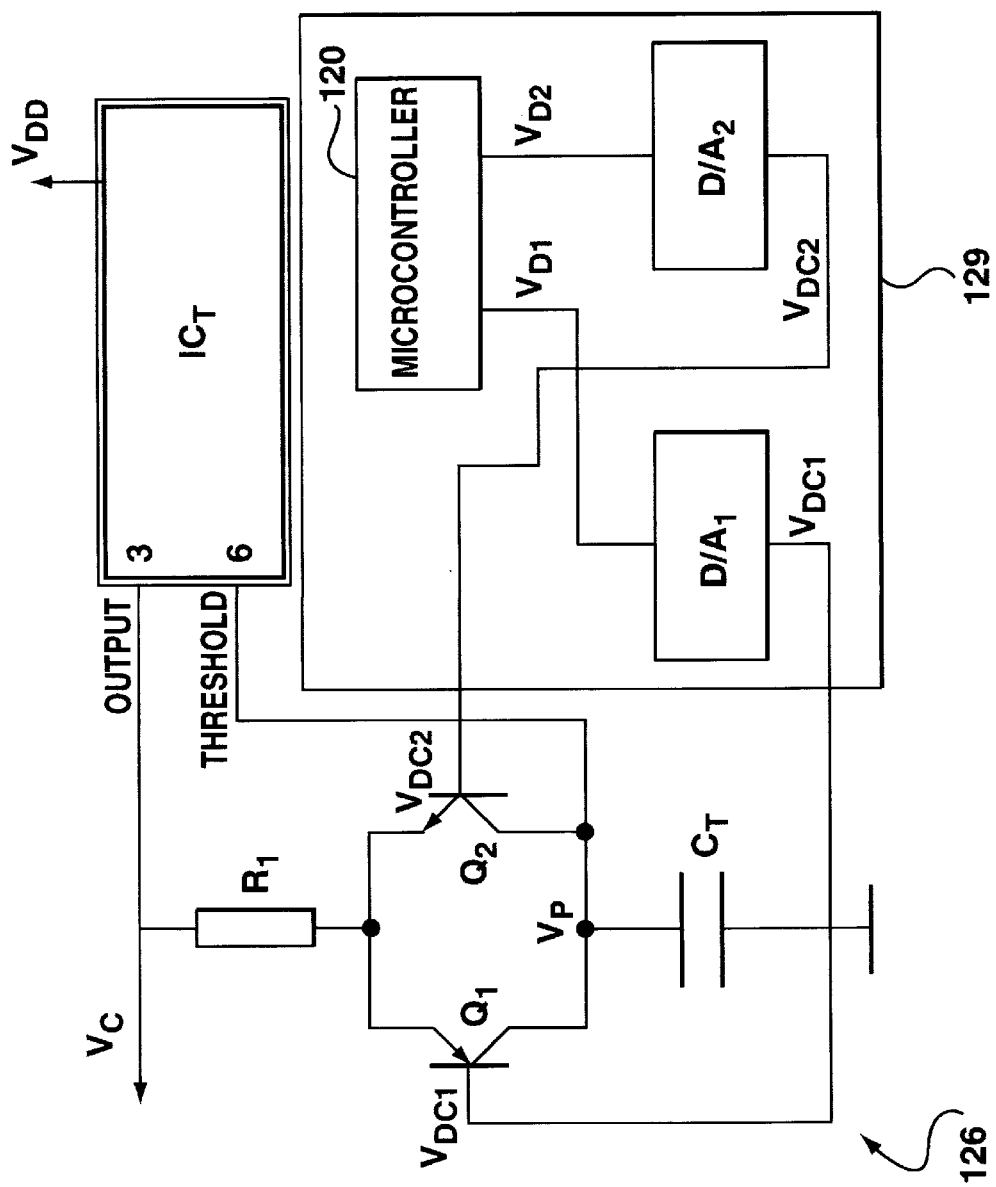
FIG. 6 is another implementation of the control circuit in which two DC voltage signals $V_{DC1}$ and $V_{DC2}$ are used to control the duty cycle and the frequency of the control voltage signal $V_C$ by controlling the rate of charging and discharging of capacitor $C_T$.

FIG. 6 shows an alternative circuit implementation of control circuit 126 which uses microcontroller 120 to independently control the control signal duty cycle $DC_C$ and the control signal frequency $f_C$ of control voltage signal $V_C$ with digital voltage signals $V_{D1}$ and $V_{D2}$. Control circuit 126 comprises controller 129, timer circuit $IC_T$, transistors $Q_1$ and $Q_2$, resistor $R_1$, and timing capacitor $C_T$.

Controller 129 comprises microcontroller 120 and two D/A converters $D/A_1$ and $D/A_2$. D/A converters $D/A_1$ and $D/A_2$ convert digital voltage signals $V_{D1}$ and $V_{D2}$ from microcontroller 120 into DC voltage signals $V_{DC1}$ and $V_{DC2}$, respectively. Each DC voltage signal $V_{DC1}$ and $V_{DC2}$ controls the operation of transistors $Q_1$ and $Q_2$, respectively, to vary the duty cycle and frequency of periodic voltage signal $V_P$ as will be described.

Timer $IC_T$ is a conventional timer (e.g. a 555 timer) powered by voltage $V_{DD}$ and utilized as a simple oscillator in the present circuit. The schematic and written description of the 555 timer circuit provided by "Microelectronic Circuits" Third Edition by Adel Sedra and Kenneth C. Smith (at pages 875 to 880) is hereby incorporated by reference. Timer $IC_T$ compares the periodic voltage signal $V_P$ at THRESHOLD (pin 6) with two internally generated threshold voltages namely $\frac{1}{3} V_{DD}$ and $\frac{2}{3} V_{DD}$. THRESHOLD (pin 6) of timer $IC_T$ is connected to the common collector junction of transistors $Q_1$ and $Q_2$ and to ground through timer capacitor $C_T$. OUTPUT (pin 3) of timer $IC_T$ produces the control voltage $V_C$ of control circuit 126. As will be explained, due to the charging and discharging of timer capacitor $C_T$, a periodic voltage signal $V_P$ with a triangular-type waveform is generated at the common collector junction. When periodic voltage signal $V_P$ is greater than $\frac{2}{3} V_{DD}$ at THRESHOLD (pin 6), internal circuitry of timer $IC_T$ will cause OUTPUT (pin 3) to go high. When periodic voltage signal $V_P$ is lower than $\frac{1}{3} V_{DD}$ at THRESHOLD (pin 6), internal circuitry of timer $IC_T$ will cause OUTPUT (pin 3) will go low. In this way, control voltage signal $V_C$ is controlled by the voltage characteristics (i.e. duty cycle and frequency) of periodic voltage signal $V_P$.

Transistors $Q_1$ and $Q_2$ are coupled to ground through timing capacitor $C_T$ and to the output of control circuit 126 through resistor $R_1$. Transistors $Q_1$ and $Q_2$ are controlled by DC voltage signals $V_{DC1}$ and $V_{DC2}$, respectively. Resistor $R_1$ and control voltage signal $V_C$ act as either a current source for transistor $Q_1$ or a current sink for transistor $Q_2$, depending on the polarity of control voltage signal $V_C$. Specifically, the collectors of transistors $Q_1$ and $Q_2$ are coupled to the ground through capacitor $C_T$ and the emitters of transistors $Q_1$ and $Q_2$ are coupled to the output of control circuit 126 through resistor $R_1$. The bases of transistors $Q_1$ and $Q_2$ are coupled to the DC voltage signal outputs of D/A converters $D/A_1$ and $D/A_2$. Accordingly, transistors $Q_1$ and $Q_2$ operate as amplifiers when they are biased in their active region by control voltage signal $V_C$ through resistor $R_1$ and their impedance values can be controlled by DC voltage signals $V_{DC1}$ and $V_{DC2}$, respectively as is conventionally known.

Thus, the control voltage signal $V_C$ produced at OUTPUT (pin 3) of timer $IC_T$, is controlled by the combined operation and relative impedance of transistors $Q_1$ and $Q_2$. When OUTPUT (pin 3) of timer $IC_T$ is high, timer capacitor $C_T$ will charge through resistor $R_1$ and transistor $Q_1$ until periodic voltage signal $V_P$ reaches $\frac{2}{3} V_{DD}$. When periodic voltage signal $V_P$ at THRESHOLD (pin 6) is $\frac{2}{3} V_{DD}$, timer $IC_T$ will force OUTPUT (pin 3) low and capacitor $C_T$ will begin discharging through transistor $Q_2$ and resistor $R_1$. Once periodic voltage signal $V_P$ at THRESHOLD (pin 6) decreases to $\frac{1}{3} V_{DD}$, OUTPUT (pin 3) will be driven high and capacitor $C_T$ will start charging through transistor $Q_1$ again. It should be noted that transistors $Q_1$ and $Q_2$ will never conduct simultaneously, as transistor $Q_1$ is only on when OUTPUT (pin 3) at timer $IC_T$ is high and transistor $Q_2$ is only on when OUTPUT of timer $IC_T$ is low.

Capacitor $C_T$ will charge or discharge at a rate based on the relative impedances of transistors $Q_1$ and $Q_2$. That is, if the impedance of transistor $Q_1$ is low, capacitor $C_T$ will charge at a higher rate than if the impedance of transistor $Q_1$ is high. Similarly if the impedance of transistor $Q_2$ is high, capacitor $C_T$ will discharge slower than if the impedance of transistor $Q_2$ is low. That is, the duty cycle and the frequency of the periodic voltage signal $V_P$ waveform are determined by the direction and rate of current that flows through timer capacitor $C_T$. As the characteristics of periodic voltage $V_P$ are changed by DC voltage signals $V_{DC1}$ and $V_{DC2}$, periodic voltage signal $V_P$ at THRESHOLD (pin 6) reaches $\frac{2}{3} V_{DD}$ and $\frac{1}{3} V_{DD}$ voltage levels at various times which alters the waveform characteristics of control voltage signal $V_C$ at OUTPUT (pin 3) of timer $IC_T$. Thus, by modifying the characteristics of periodic voltage signal $V_P$, it is possible to control the pulse duration and pause duration of the high and low signals produced by OUTPUT (pin 3) of timer $IC_T$ and accordingly the duty cycle and frequency of control voltage $V_C$ can be controlled.

Figure 7A:
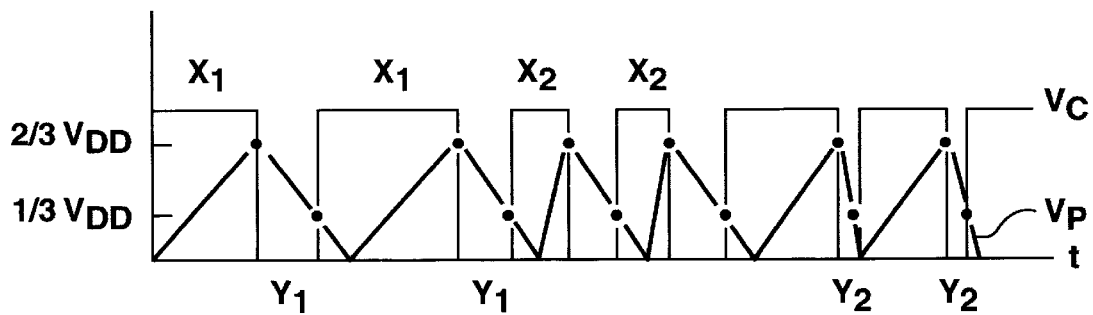
FIG. 7A is a waveform timing diagram showing the periodic voltage signal $V_P$ and control voltage signal $V_C$ of FIG. 6.
Figure 7B:
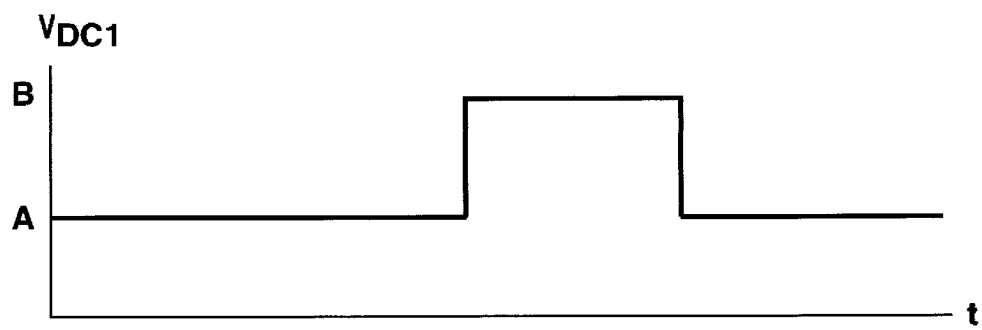
FIG. 7B is a waveform timing diagram showing the DC voltage signal $V_{DC1}$ of FIG. 6.
Figure 7C:
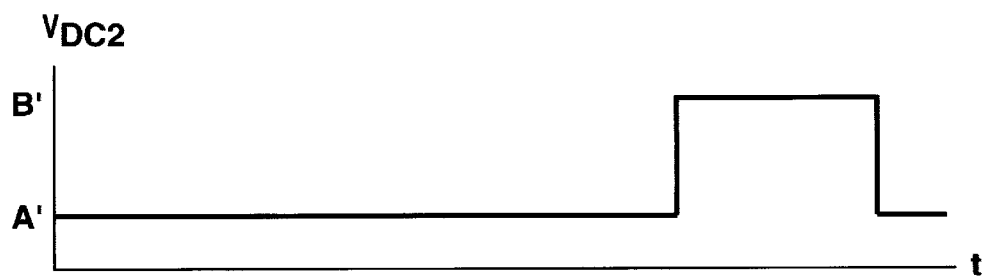
FIG. 7C is a waveform timing diagram showing the DC voltage signal $V_{DC2}$ of FIG. 6.

As an illustration of how a control voltage signal $V_C$ is generated by the circuit of FIG. 6, a typical periodic voltage signal $V_P$ produced at the common collector junction of transistors $Q_1$ and $Q_2$ is shown in FIG. 7A. When DC voltage signal $V_{DC1}$ as shown in FIG. 7B is applied to the base of transistor $Q_1$ and DC voltage signal $V_{DC2}$ as shown in FIG. 7C is applied to the base of transistor $Q_2$, the control voltage signal $V_C$ as shown superimposed on periodic voltage signal $V_P$ in FIG. 7A results. Specifically, when DC voltage signal $V_{DC1}$ is at DC level A (FIG. 7B), periodic voltage signal $V_P$ causes control voltage signal $V_C$ at OUTPUT (pin 3) of timer $IC_T$ to have a pulse duration of $X_1$ and a pause duration $Y_1$ as shown. When DC voltage signal $V_{DC1}$ is increased to DC level B (FIG. 7B), increased current flows through transistor $Q_1$ when capacitor $C_T$ is charging and thus capacitor $C_T$ is charged at an increased rate. This causes control voltage signal $V_C$ to have a pulse duration $X_2$ (FIG. 7A) which is less than the initial pulse duration, as shown. Similarly, when DC voltage signal $V_{DC2}$ (FIG. 7C) is increased from DC level A' to B', increased current flows through transistor $Q_2$ when capacitor $C_T$ is discharging and thus capacitor $C_T$ is discharged at an increased rate. This results in a shorter pause duration $Y_2$, as shown.

In this way, a low-speed microcontroller 120 can provide sufficient digital voltage signals which can be converted into a wide variety of analog signals that can individually control the charge time and discharge time of timing capacitor $C_T$. In this way, it is possible to control the duration of the pulses for the control voltage signal $V_C$ and the pauses between the pulses to an extremely high degree of resolution. Thus both the control signal duty cycle $DC_C$ and the control signal frequency $f_C$ can be independently controlled to a wide degree by a relatively low-speed microcontroller 120. Further, since the control voltage signals $V_C$ are analog, it is possible to modulate illumination levels on a continuously variable basis.

Figure 8:
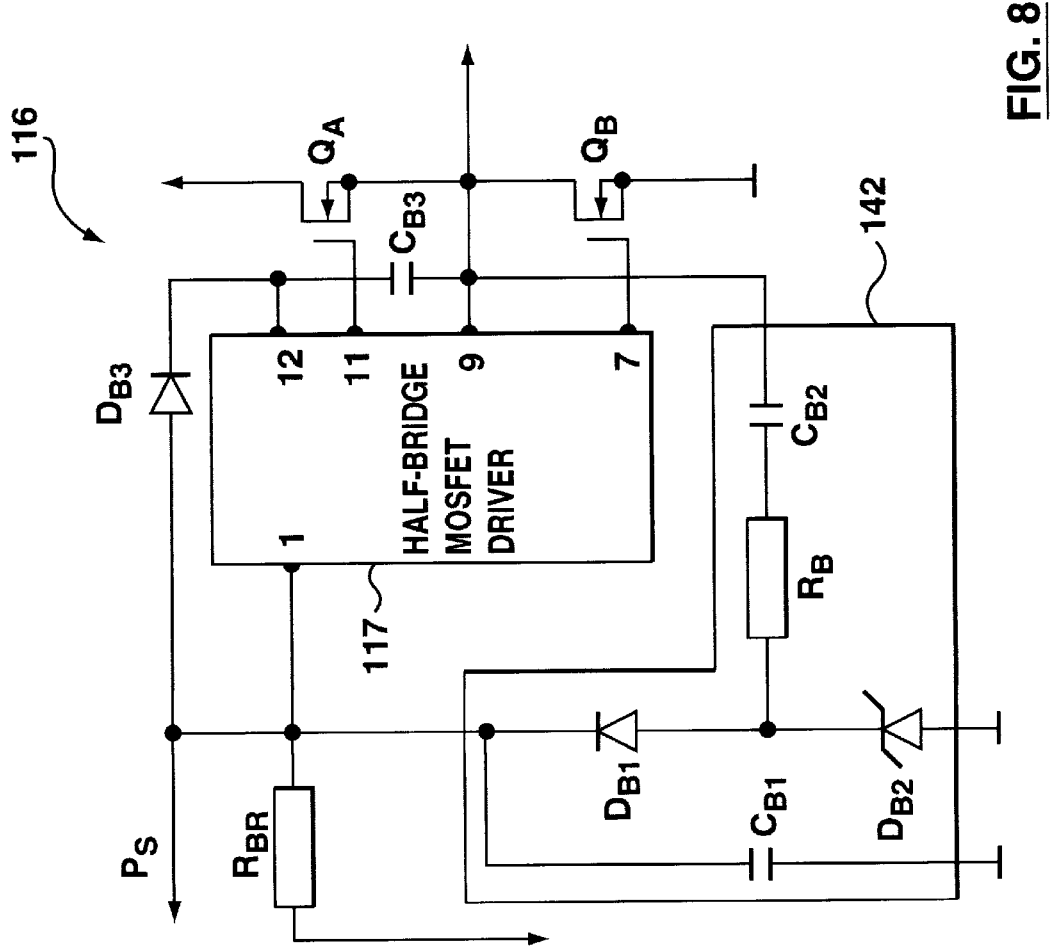
FIG. 8 is a circuit diagram illustrating how the microcontroller can be powered using a half-bridge driver.

Another aspect of the present invention relates to the ability to power microcontroller 120 within a conventional ballast 110 without the conventional disadvantages. Typical microcontroller-based ballasts power microcontroller and other associated control circuity components either through a drop-down resistor which causes problems associated with heat and high frequency noise or by using a dedicated off-line power supply circuitry which is costly. Accordingly, it is desirable to provide a clean high frequency power signal that can be easily filtered and converted to DC voltage sufficient to power the microcontroller 120 and associated control circuitry 126 without the associated problems As illustrated in FIG. 8, the present invention provides power signal $P_S$ to microcontroller 120 by extracting energy from half-bridge MOSFET driver 117 using a conventionally known bootstrap power supply 142. As has been discussed, inverter 116 contains a MOSFET driver 117 which drives transistors $Q_A$ and $Q_B$ from a HIGHSIDE MOSFET SIGNAL OUTPUT (pin 11) and a LOWSIDE MOSFET SIGNAL OUTPUT (pin 7). Bootstrap power supply 142 is connected to bootstrap output (pin 12) and FLOATING GROUND POINT (pin 9) of MOSFET driver 117. FLOATING GROUND POINT is connected to the common node of transistors $Q_A$ and $Q_B$. POWER SUPPLY (pin 1) of MOSFET driver 117 is fed to the input of bridge rectifier 112 through resistor $R_{BR}$. Bootstrap power supply 142 provides power signal $P_S$ to microcontroller 120 through reverse-connected diode $D_{B3}$ and capacitor $C_{B3}$ and through forward-connected diode $D_{B1}$, as is conventionally known. Bootstrap power supply 142 comprises diodes $D_{B1}$, $D_{B2}$, resistor $R_B$ and capacitors $C_{B1}$ and $C_{B2}$ as is conventionally known.

Figure 9:
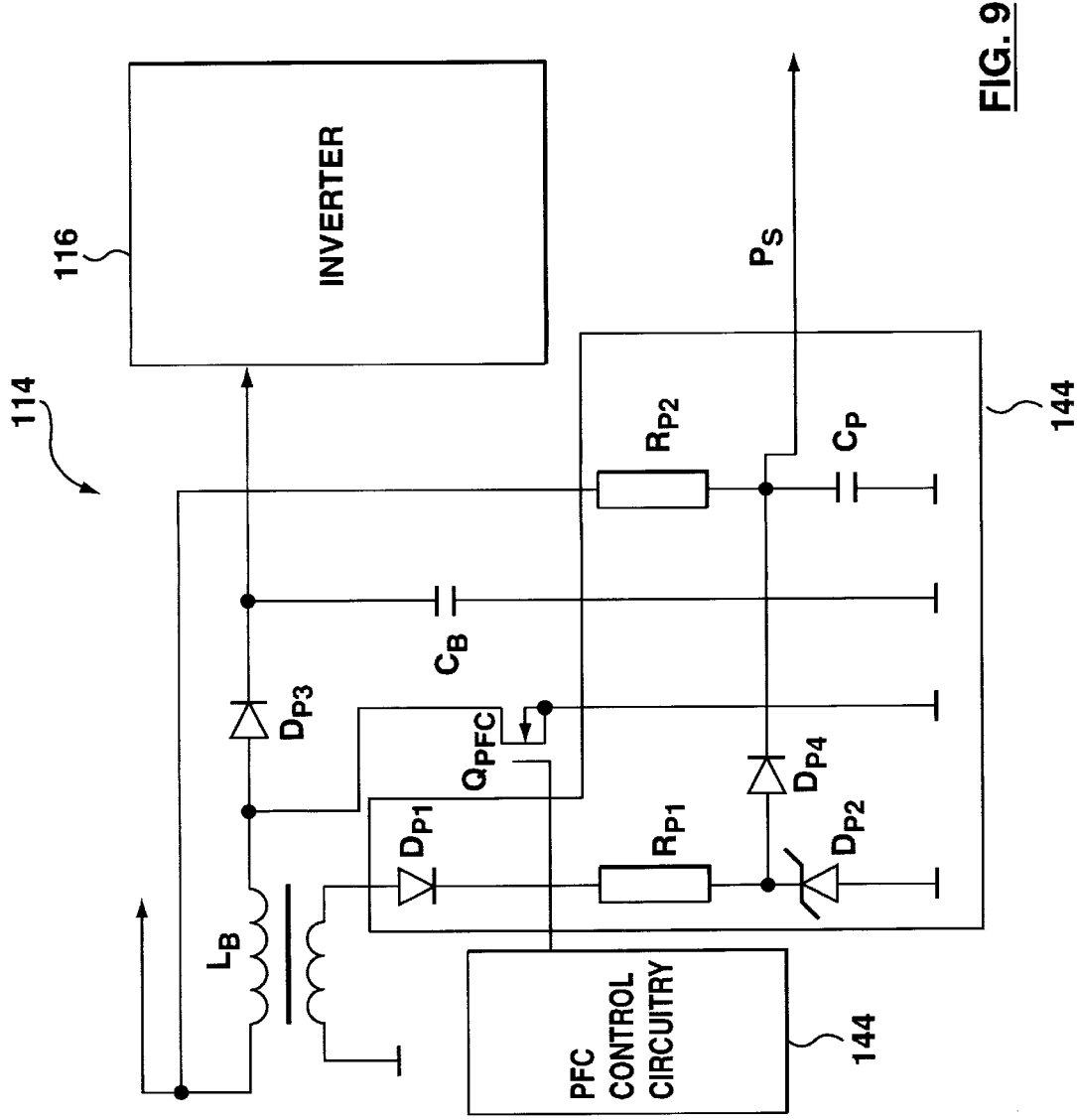
FIG. 9 is a circuit diagram illustrating how the microcontroller can be powered using a boost inductor.

FIG. 9 shows an alternative way of providing microcontroller 120 with a power supply signal $P_S$, namely by extracting power from a boost inductor $L_B$ of boost converter 114. Boost converter 114 typically comprises boost inductor $L_B$, a PFC MOSFET transistor $Q_{PFC}$, a bulk capacitor $C_B$, diode $D_{P3}$ and PFC control circuity 143.

Diode $D_{P3}$ acts as a uni-directional switch. When diode $D_{P3}$ is forward biased (and MOSFET $Q_{PFC}$ is open), current flowing through boost inductor $L_B$ from bridge rectifier 112 will charge bulk capacitor $C_B$ to an output voltage level. Diode $D_{P3}$ prevents bulk capacitor $C_B$ from discharging through MOSFET $P_{PFC}$ (if closed) or through boost inductor $L_B$. This allows bulk capacitor $C_B$ to be charged or "boosted" to exceed the AC input voltage applied to ballast 110, as is conventionally known.

Power adaption circuit 144 is shown comprising diodes $D_{P1}$, $D_{P2}$, $D_{P4}$, resistors $R_{P1}$, and $R_{P2}$, and capacitor $C_P$. Diode $D_{P1}$, $D_{P4}$ and resistor $R_{P1}$ are connected in series to secondary winding of boost inductor $L_B$ such that current flows to microcontroller 120. Schottky diode $D_{P2}$ is reverse-connected to ensure a stable voltage drop at the node between resistor $R_{P1}$ and forward-connected diode $D_{P4}$. Power supply signal $P_S$ is provided to microcontroller 120 from the common node between resistor $R_{P2}$ and capacitor $C_P$. Capacitor $C_P$ is used to smooth power signal $P_S$ and resistor $R_{P2}$ is used as a "start-up" resistor to ensure that capacitor $C_P$ undergoes several start-up charging cycles when ballast is started.

Figure 10:
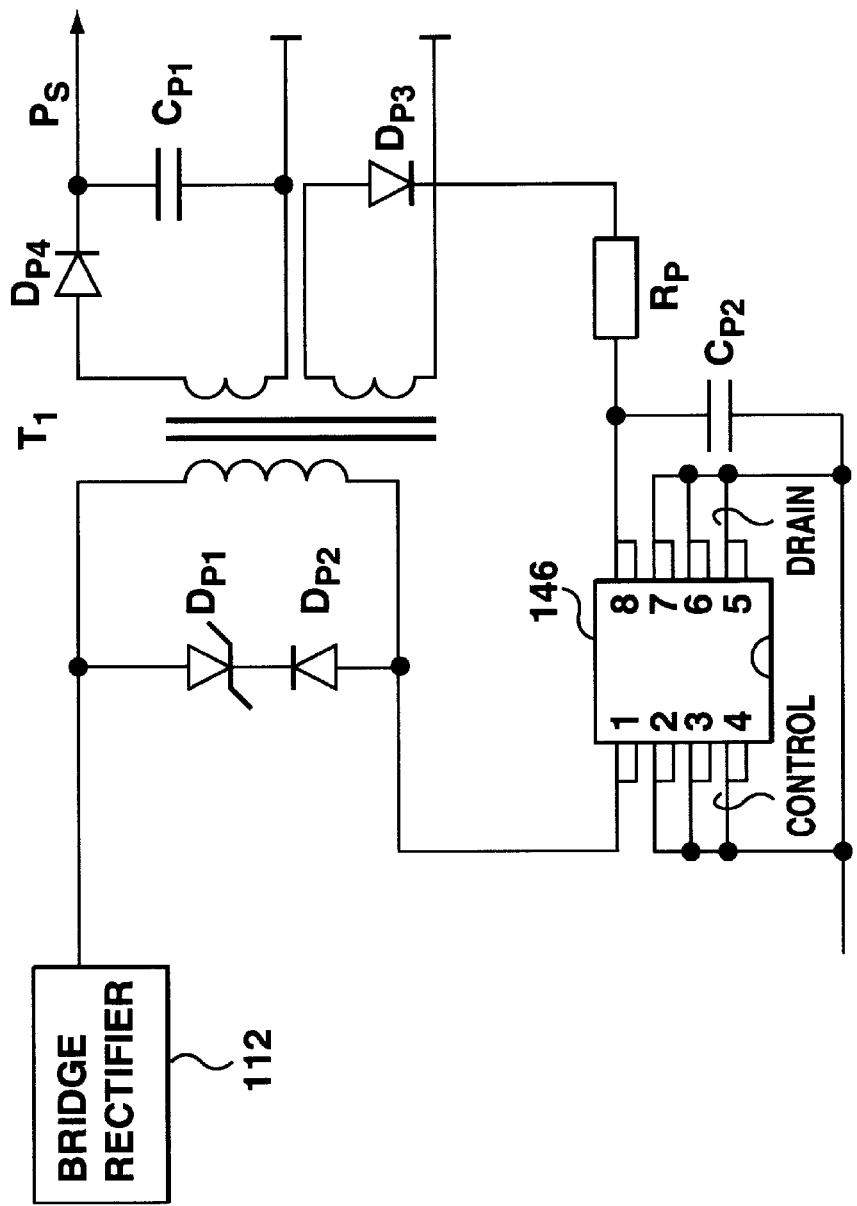
FIG. 10 is a circuit diagram illustrating how the microcontroller can be powered using a miniature switch mode power supply.

Finally, as shown in FIG. 10 microcontroller 120 can be powered by a power supply signal $P_S$ which is generated by a dedicated miniature switch mode power supply 146 appropriately configured as is conventionally known. Switch mode power supply 146 can be restricted to producing between 2 to 3 watts and is a reliable but somewhat expensive alternative to the previous alternatives. Switch mode power supply 146 can be any commercially available miniature switch mode power supply 146, such as a TOP210 three terminal off-line PWM switch integrated circuit manufactured by Power Integrations, Inc. as will be assumed for the following discussion.

Switch mode power supply 146 can be configured to provide power supply signal $P_S$ using transformer $T_1$, diodes $D_{P1-P4}$, capacitors $C_{P1}$ and $C_{P2}$, and resistor $R_P$ as shown. The primary winding of transformer $T_1$ receives the high voltage DC signal from bridge rectifier 112 and the other side of the primary is driven by the integrated high-voltage MOSFET within power supply 146. Specifically, power supply signal $P_S$ is determined by the voltage across CONTROL (pin 4) of power supply 146, the voltage drops of diode $D_{P4}$ and $D_{P3}$, and the turns ratio between the bias winding and output windings of transformer $T_1$. Other output voltages can be produced by adjusting the turns ratios of transformer $T_1$. Diodes $D_{P1}$ and $D_{P2}$ clamp the voltage spike caused by transformer leakage to a safe value and reduce ringing at DRAIN (pin 5) of power supply 146. The power secondary winding is rectified and filtered by diode $D_{P4}$ and capacitor $C_{P1}$ to create power supply signal $P_S$. The voltage waveform across bias winding is rectified and filtered by diode $D_{P3}$, resistor $R_P$ and capacitor $C_{P2}$ to create a bias voltage to power supply 146. Capacitor $C_{P2}$ also filters internal MOSFET gate drive charge current spikes on the CONTROL pin, determines the auto-restart frequency, and together with $R_P$, compensates the control loop.

Figure 11:
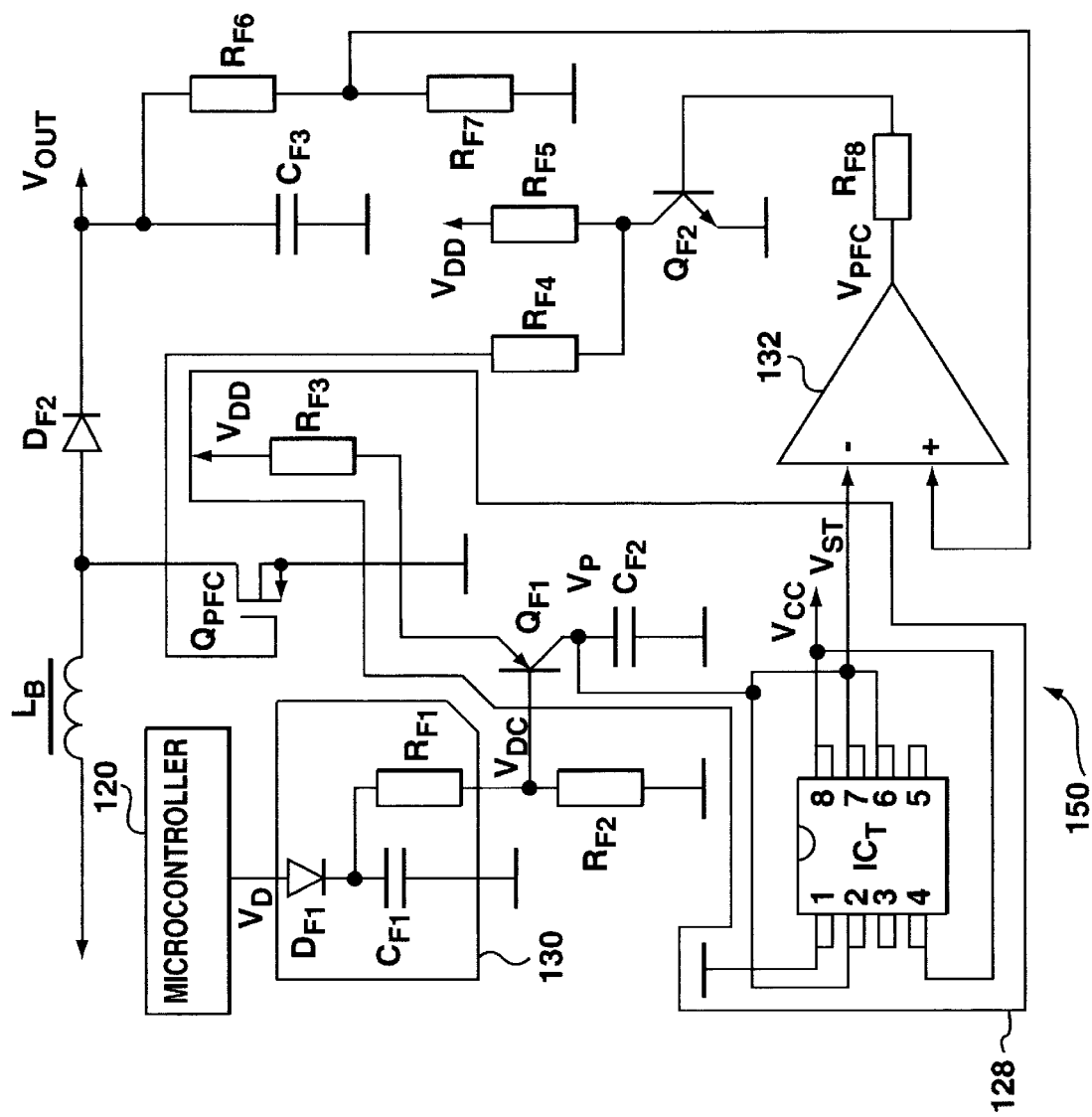
FIG. 11 is a circuit diagram of the control circuit of the present invention for achieving power factor correction.

Now referring to FIG. 11, another aspect of the present invention is shown whereby a voltage stabilization feedback circuit 150 is used to regulate the level of boost converter 114 output voltage signal $V_{OUT}$. A conventional method of creating power factor correction (PFC) circuity for electronic ballasts is by using boost converter circuity. However, it is usually impossible to adjust output voltage of the PFC circuity when the lamp load changes, during the course of dimming and when input voltage is varied.

Generally, the output voltage signal $V_{OUT}$ of boost converter 114 driven in continuous current mode and with constant frequency and supplied with an input voltage signal $V_{IN}$ can be described as follows:

$$V_{OUT} = \frac{V_{IN}}{(1-D)}$$

where D is the duty cycle of the operational voltage. However, less well recognized is that by changing frequency within a continuous current mode of operation, output voltage signal $V_{OUT}$ can be adjusted within certain limits. The expression for output voltage signal $V_{OUT}$ versus switching frequency F can be defined as follows:

$$F = \frac{1}{(t_{ON} + t_{OFF})}$$

where $t_{ON}$ is the switch on-time and $t_{OFF}$ is the switch off-time which in turn can be defined as follows:

$$t_{ON} = 2P_{OUT}\frac{L}{\eta}V_{IN}^2 \text{ and } t_{OFF} = \frac{2P_{OUT}\frac{L}{\eta}V_{IN}^2}{\left(\left(\frac{V_{OUT}}{\sqrt{2}}V_{IN}K\right)-1\right)}$$

where $P_{OUT}$ is the output power, L is the inductance of the boost inductor, $\eta$ is the efficiency, $V_{IN}$ is the input voltage and K is the input voltage form coefficient, as is conventionally understood. By rearranging these relations, output voltage signal $V_{OUT}$ can be written as follows:

$$V_{OUT} = \frac{1}{\frac{V_{IN}K}{\sqrt{2}} - \sqrt{2}FP\frac{L}{\eta}V_{IN}^3 K}$$

Thus, when output power $P_{OUT}$, efficiency of the inverter $\eta$, boost inductance L, and input voltage signal $V_{IN}$ are fixed, the relationship between output voltage signal $V_{OUT}$ and frequency F has a hyperbolic character. Taking these principles into account, the inventor has determined that it is possible to adjust boost converter output voltage signal $V_{OUT}$ using microcontroller 120 and a voltage stabilizing feedback circuit 150.

Specifically, feedback circuit 150 comprises capacitors $C_{F1-F3}$, diodes $D_{F1-F2}$, resistors $R_{1-7}$, 555 timer circuit $IC_T$, comparator 132, and transistors $Q_{F1-F2}$. As previously discussed, diode $D_{F1}$, capacitor $C_{F1}$ and resistor $R_{F1}$ are configured to form a simple D/A converter 130 which serves to convert a digital signal $V_D$ produced by microcontroller 120 to a DC signal $V_{DC}$. DC signal $V_{DC}$ is used to control the current source of the periodic generator 128 by triggering transistor $Q_{F1}$ which has its emitter connected to voltage signal $V_{DD}$ through resistor $R_{F3}$ and to ground through capacitor $C_{F2}$. Also as previously discussed, the collector of transistor $Q_{P1}$ is coupled to TRIGGER (pin 2), THRESHOLD (pin 6) and DISCHARGE (pin 7) of 555 timer circuit $IC_T$ to produce periodic voltage signal $V_P$ as previously described in detail in respect of FIG. 5. The periodic voltage signal $V_P$ is input into the negative terminal of comparator 132.

Further, the voltage output of the boost converter 114 $V_{OUT}$ is applied through diode $D_{F2}$, capacitor $C_{F3}$ and across voltage divider comprising resistors $R_{F6}$ and $R_{F7}$ into the positive terminal of comparator 132. The power factor correction signal $V_{PFC}$ produced by comparator 132 is used to control the output voltage signal $V_{OUT}$ produced by boost converter 114 by controlling the operation of PFC MOSFET transistor $Q_{PFC}$. Specifically, power factor correction signal $V_{PFC}$ is used to control the current source comprising transistor $Q_{F2}$ and resistor $R_{F5}$ driven by voltage $V_{DD}$. Thus, by appropriately varying the duty cycle of the PFC voltage signal being applied to transistor $Q_{PFC}$, in such a feedback configuration it is possible to stabilize the output of boost converter 114, as is conventionally understood.

As before, microcontroller 120 controls the frequency of power factor correction signal $V_{PFC}$ by controlling the current source connected to timer $IC_T$. Further, the duty cycle of PFC signal $V_{PFC}$ is determined by the difference between boost converter output voltage signal $V_{OUT}$ and the voltage signal $V_P$ and varies itself to maintain output voltage when either the input voltage or the output load fluctuate. By changing the frequency and duty cycle of the periodic voltage signal $V_P$, the PFC signal $V_{PFC}$ supplied to transistor $Q_{PFC}$ can regulate the output voltage $V_{OUT}$ of boost converter 114. Accordingly, a relatively low-speed microcontroller 120 can achieve stabilization of the boost converter 114.

In use, control circuit 126 of ballast 110 utilizes a low-speed microcontroller 120 to successfully control the operation of MOSFET driver 117 of a conventional inverter circuit 116 using a control voltage $V_C$. Control circuit 126 can vary the duty cycle $DC_C$ and control voltage frequency $f_C$ of a control voltage signal $V_C$ to a high degree of resolution. Control circuit 126 generates a periodic voltage signal $V_P$ and modulates the periodic voltage $V_P$ so that certain DC levels are detected at differing frequencies. These DC levels are used to generate the control voltage $V_C$ by either comparing the periodic voltage signal $V_P$ with an analog DC signal through a comparator to produce control voltage $V_C$ or by passing the periodic voltage signal $V_P$ through a timer $IC_T$ to suitably trigger THRESHOLD (pin 6) of timer $IC_T$ to generate control voltage $V_C$ at OUTPUT (pin 3) of timer $IC_T$.

Further, the present invention allows for control circuit 126 to be powered using a number of convenient power sources within a conventional ballast 110. First, microcontroller 120 can be powered by a power supply signal $P_S$ derived from half-bridge MOSFET driver 117 of inverter 116, using a conventionally known bootstrap power supply 142. Second, microcontroller 120 can be powered by a power supply signal $P_S$ which is extracted from a boost inductor $L_B$ (FIG. 11) of boost converter 114. Finally, as microcontroller 120 can be powered by a power supply signal $P_S$ generated by a appropriately configured dedicated miniature switch mode power supply 146, such as a TOP210 three terminal off-line PWM switch integrated circuit manufactured by Power Integrations, Inc.

Control circuit 126 can also be applied to stabilize the level of boost converter 114 output voltage signal $V_{OUT}$ by providing a feedback control signal $V_{PFC}$ to the PFC MOSFET $Q_{PFC}$. Microcontroller 120 is used to control the frequency and duty cycle of power factor correction signal $V_{PFC}$ by controlling the frequency and duty cycle of the periodic voltage signal $V_P$ and comparing the periodic voltage signal $V_P$ to the output voltage $V_{OUT}$ to determine a proper feedback control voltage signal $V_{PFC}$.

Accordingly, the present invention provides a universal lighting ballast control circuit which generates a wide range of different control signals to start, run and dim a wide variety of gas-discharge lamp types using an inexpensive low-speed microcontroller. By providing a high umber of continuously variable control signals, the present invention an eliminate visible steps of light intensity which would otherwise occur when dimming a lamp. Further, the microcontroller can be powered within a typical ballast without conventionally known power supply problems and associated expenses. Finally, the present invention can be used to regulate the boost converter output voltage to control and stabilize the operation of the power factor correction circuitry.

As will be apparent to persons skilled in the art, various modifications and adaptations of the structure described above are possible without departure from the present invention, the scope of which is defined in the appended claims.

I claim:

1. A universal ballast control circuit for use with a power circuit coupled to an AC source for outputting a high frequency AC signal and a coupling circuit coupled to the power circuit for applying the AC signal to any one of a plurality of gas discharge lamp types, said control circuit comprising:
   (a) a generator for generating a periodic analog voltage signal having a first waveform;
   (b) a source for generating a first DC voltage signal having a second waveform;
   (c) a controller for controlling the frequency of the periodic analog voltage signal; and
   (d) a processor for processing said first DC voltage signal and said periodic analog voltage signal to generate a control voltage signal for varying the frequency and duty cycle of the AC signal, the frequency and duty cycle of said control voltage signal being dependent on said first and second waveforms.

2. The universal ballast control circuit of claim 1, wherein the source comprises a microcontroller and a first digital-to-analog converter coupled to the microcontroller for generating said first DC voltage signal for controlling the magnitude of the first DC voltage signal.

3. The universal ballast control circuit of claim 1, wherein the controller comprises a microcontroller and a second digital-to-analog converter coupled to the microcontroller for generating a second DC voltage signal for controlling the frequency of the periodic analog voltage signal.

4. The universal ballast control circuit of claim 1, wherein the processor comprises a comparator circuit for comparing said first waveform with said second waveform.

5. The universal ballast control circuit of claim 4, wherein the comparator circuit generates a first voltage level when the first waveform is less than the second waveform and generating a second voltage level when the first waveform is greater than the second waveform.

6. The universal ballast control circuit of claim 1, wherein the generator comprises a timer circuit coupled to a current source and a capacitor such that a sawtooth voltage signal is produced across the capacitor.

7. The universal ballast control circuit of claim 1, wherein the controller comprises a microcontroller and first and second digital-to-analog converters coupled to the microcontroller for generating first and second DC control voltage signals.

8. The universal ballast control circuit of claim 7, wherein the generator comprises a capacitor coupled to a current source and a current sink such that the capacitor charges with current in accordance with said first DC control voltage signal applied to the current source and the capacitor discharges current in accordance with said second DC control voltage signal applied to the current sink such that said periodic analog voltage signal is generated across the capacitor and such that the shape of said first waveform is controlled by said first and second DC control voltage signals.

9. The universal ballast control circuit of claim 1, wherein the source comprises a timer circuit which internally generates said first DC voltage signal and a second DC voltage signal having a third waveform.

10. The universal ballast control circuit of claim 9, wherein the processor comprises said timer circuit for comparing said first waveform with said second waveform and for comparing said first waveform with said third waveform.

11. The universal ballast control circuit of claim 10, wherein said timer circuit generates a first voltage level when the first waveform rises above said second waveform and a second voltage level when the first waveform falls below said third waveform.

12. The universal ballast control circuit of claim 2 or 7, wherein said microcontroller is a low speed microcontroller having a processing speed of up to 8 megahertz.

13. The universal ballast control circuit of claim 2 or 7, wherein the power circuit comprises a half-bridge output to provide operational power to said microcontroller.

14. The universal ballast control circuit of claim 2 or 7, wherein the power circuit comprises a boost inductor to provide operational power to said microcontroller.

15. The universal ballast control circuit of claim 2 or 7, wherein the power circuit comprises a dedicated miniature switch mode power supply to provide operational power to said microcontroller.

16. A universal ballast control circuit for use with a power circuit coupled to an AC source for outputting a high frequency AC signal and a coupling circuit coupled to the power circuit for applying the AC signal to any one of a plurality of gas discharge lamp types, said control circuit comprising:

(a) a generator for generating a periodic analog voltage signal having a first waveform;

(b) a controller for controlling the shape of said first waveform; and (c) a comparator for comparing the periodic analog voltage signal with at least one DC voltage and for generating a control voltage signal for varying the duty cycle and frequency of the AC signal.

17. The universal ballast control circuit of claim 16, wherein the controller comprises a microcontroller and first and second digital-to-analog converters coupled to the microcontroller for generating first and second DC control voltage signals.

18. The universal ballast control circuit of claim 17, wherein the generator comprises a capacitor coupled to a current source and a current sink such that the capacitor charges with current in accordance with said first DC control voltage signal applied to the current source and the capacitor discharges current in accordance with said second DC control voltage signal applied to the current sink such that said periodic analog voltage signal is generated across the capacitor and such that the shape of said first waveform is controlled by said first and second DC control voltage signals.

19. The universal ballast control circuit of claim 16, wherein the comparator comprises an oscillator circuit for generating first and second DC voltages, for comparing said first waveform with first and second DC voltages, and for generating a first voltage level when the first waveform rises above said first DC voltage and a second voltage level when the first waveform drops below said second DC voltage.

20. The universal ballast control circuit of claim 17, wherein said microcontroller is a low speed microcontroller having a processing speed of up to 8 megahertz.

21. A method of powering any one of a plurality of gas discharge lamp types, each lamp type having a predetermined set of lamp characteristics, said method comprising the steps of:

(a) producing a high frequency AC signal;

(b) applying the AC signal to the lamp;

(c) generating a periodic analog voltage signal having a first waveform;

(d) generating a DC voltage signal having a second waveform;

(e) controlling the frequency of the periodic analog voltage signal;

(f) controlling the magnitude of the DC voltage signal;

(g) varying the duty cycle and frequency of the AC signal based on a comparison of the first and second waveforms.

22. A method of powering any one of a plurality of gas discharge lamp types, each lamp type having a predetermined set of lamp characteristics, said method comprising the steps of:

(a) producing a high frequency AC signal;

(b) applying the AC signal to the lamp;

(c) generating a periodic analog voltage signal having a first waveform;

(d) controlling the shape of the first waveform;

(e) varying the duty cycle and frequency of the AC signal based on a comparison of first waveform and at least one DC threshold voltage.

23. A method of controlling the output voltage of a boost converter of a gas-discharge lighting ballast, said method comprising the steps of:

(a) applying a DC signal to a power switch to produce a boost converter output voltage;

(b) generating a periodic analog voltage signal having a first waveform;

(c) controlling the frequency of the periodic analog voltage signal and the magnitude of the DC voltage signal;

(d) comparing the first waveform with the boost converter output voltage; and (e) applying the result to the power switch to change the output voltage of the boost converter.

* * * * *